United States Patent [19]

Lovecky et al.

[11] Patent Number: 5,169,088
[45] Date of Patent: Dec. 8, 1992

[54] VIDEO CASSETTE COMBINED DUST DOOR AND DUST DOOR LATCH SPRING

[75] Inventors: Craig Lovecky, Old Orchard Beach, Me.; Alan Lowry, Canton, Mass.; W. Tyler Fitzsimmons, Washington, D.C.; Richard Rolfe, Biddeford, Me.

[73] Assignee: Shape, Inc., Biddeford, Me.

[21] Appl. No.: 598,961

[22] Filed: Oct. 17, 1990

Related U.S. Application Data

[63] Continuation-in-part of Ser. No. 389,401, Aug. 4, 1989, Pat. No. 5,026,000, and a continuation-in-part of Ser. No. 562,004, Aug. 1, 1990.

[51] Int. Cl.$^5$ .............................................. G11B 23/04
[52] U.S. Cl. ..................................................... 242/199
[58] Field of Search ............................. 242/197-200; 360/132

[56] References Cited

U.S. PATENT DOCUMENTS

| | | | |
|---|---|---|---|
| 3,661,250 | 5/1972 | Lyman | 206/52.F |
| 3,735,939 | 5/1973 | Inaga | 242/198 |
| 3,809,219 | 5/1974 | Esashi | 220/55 K |
| 3,900,172 | 8/1975 | Kamaya . | |
| 4,022,395 | 5/1977 | Kishi | 242/198 |
| 4,180,220 | 12/1979 | Shiba et al. | 242/199 |
| 4,212,437 | 7/1980 | Shiba et al. | 242/199 |
| 4,214,719 | 7/1980 | Kato | 242/198 |
| 4,225,100 | 9/1980 | Sugawara | 242/198 |
| 4,323,207 | 4/1982 | Gebeke | 242/198 |
| 4,358,070 | 11/1982 | Okamura et al. | 242/197 |
| 4,389,690 | 6/1983 | Oishi et al. | 360/132 |
| 4,399,480 | 8/1983 | Edwards | 360/132 |
| 4,418,373 | 11/1983 | Fujimori et al. | 360/132 |
| 4,436,201 | 3/1984 | Inaba | 206/444 |
| 4,466,583 | 8/1984 | Giannis et al. | 242/198 |
| 4,475,700 | 10/1984 | MacLeod, Jr. et al. | 242/197 |
| 4,524,927 | 6/1985 | Sieben . | |
| 4,527,755 | 7/1985 | Rood et al. | 242/199 |
| 4,533,093 | 8/1985 | Gelardi et al. | 242/197 |
| 4,591,936 | 5/1986 | Kikuya et al. . | |
| 4,697,702 | 10/1987 | Urayama | 242/199 |
| 4,712,150 | 12/1987 | Pertzsch et al. | 360/132 |
| 4,723,179 | 2/1988 | Posso | 360/132 |

(List continued on next page.)

FOREIGN PATENT DOCUMENTS

| | | |
|---|---|---|
| 88438 | 9/1983 | European Pat. Off. . |
| 162487 | 11/1985 | European Pat. Off. . |
| 179169 | 5/1986 | European Pat. Off. . |
| 189989 | 8/1986 | European Pat. Off. . |
| 8504032 | 9/1985 | Fed. Rep. of Germany . |
| 60-113384 | 6/1985 | Japan . |
| 78200544 | 1/1989 | Taiwan . |
| 1149668 | 4/1969 | United Kingdom . |
| 1272684 | 5/1972 | United Kingdom . |
| 1411967 | 10/1975 | United Kingdom . |
| 1416588 | 12/1975 | United Kingdom ⅰ |
| 2227478 | 8/1990 | United Kingdom . |

OTHER PUBLICATIONS

Feinwerktechnik & Messtechnik 93, Aug.–Sep. (1985), No. 6, Munchen, Deutschlad, "Die Automatische Montage von Video-Cassetten", Von Heinrich et al.

Primary Examiner—Daniel P. Stodola
Assistant Examiner—William G. Battista, Jr.
Attorney, Agent, or Firm—Staas & Halsey

[57] ABSTRACT

A short leg and coil of a torsion spring fit on a dust door polar member and a long leg having a first end connected to the coil and a second free end extends therefrom. An offset is formed between the first and second ends of the long leg and is received by a cassette cover and the free end engages a perpendicular projection formed on a dust door latch. In a second embodiment, a lower portion of the latch can flex relative to an upper portion, and a leaf spring is integrally formed to extend from the upper portion. The dust door polar member has a cam which cooperates with the leaf spring. In the first embodiment, when the latch is actuated by a pin the dust door is unlatched and rotated to the open position. When the pin is released, the long leg biases the latch back into a latched position and, simultaneously, the rest of the spring closes the door. In the second embodiment, the pin flexes the lower portion of the latch relative to the upper portion, and the cam loads the leaf spring upon opening the door. Upon release of the pin, the lower portion of the latch flexes back and the door is closed.

9 Claims, 7 Drawing Sheets

U.S. PATENT DOCUMENTS

| | | | |
|---|---|---|---|
| 4,727,445 | 2/1988 | Satoh et al. | 360/132 |
| 4,728,056 | 3/1988 | Onmori et al. | 242/198 |
| 4,737,875 | 4/1988 | Shiba et al. | 360/132 |
| 4,738,361 | 4/1988 | Ackeret | 206/307 |
| 4,744,530 | 5/1988 | Cybulski et al. | 242/198 |
| 4,747,563 | 5/1988 | Sasaki et al. | 242/199 |
| 4,750,074 | 6/1988 | Oishi | 360/132 |
| 4,768,122 | 8/1988 | Kawada | 360/132 |
| 4,780,783 | 10/1988 | Osawa et al. | 360/132 |
| 4,786,012 | 11/1988 | Ino et al. | 242/198 |
| 4,791,504 | 12/1988 | Igarashi et al. | 360/132 |
| 4,824,044 | 4/1989 | Oogi | 242/198 |
| 4,884,158 | 11/1989 | Pertzsch et al. | |
| 4,915,322 | 4/1990 | Schoettle et al. | 360/132 X |
| 5,026,000 | 6/1991 | Gelardi et al. | 242/199 |

VIDEO CASSETTE COMBINED DUST DOOR AND DUST DOOR LATCH SPRING

BACKGROUND OF THE INVENTION

CROSS REFERENCE TO RELATED APPLICATIONS

This application is a continuation-in-part of co-pending application Serial Nos. 389,401, entitled "Video Cassette Integral dust Door Latch/Spring", filed Aug. 4, 1989, now U.S. Pat. No. 5,026,000 titled "Video Cassette Dust Door Latch", filed Aug. 1, 1990.

FIELD OF THE INVENTION

This invention relates to tape cassettes and, more particularly, to a common spring extending between a video cassette dust door and dust door latch.

DESCRIPTION OF THE RELATED ART

A conventional tape cassette usually has a flat, substantially rectangular, configuration which may be formed of a suitable plastic, and includes a cassette cover and base, each having side walls. Tape reels are usually located in side-by-side relation within the cassette so as to be freely rotatable, and magnetic tape is wound between the tape reels.

Such cassettes also usually include a dust door hinged for movement between open and closed positions, and a pivotable dust door latch for temporarily latching the dust door in the closed position. The closed dust door protects the tape in the cassette from dust, abrasion, etc., when the cassette is not being used in a tape player/recorder e.g., during transport and storage.

More particularly, U.S. Pat. No. 4,180,220, issued to Shiba et al., discloses a cassette housing having a pivotally connected dust door. Located on one side of the dust door is a polar member having one end fixed to the dust door and a free end including a slit. This polar member functions as one of the pivots for the dust door. A torsion spring having a coil and a short leg and a long leg extending therefrom is "loaded" in order to effect torsion of the spring and accordingly bias the dust door normally in the closed position. More particularly, the short leg of the coil spring is inserted into the slit. Then, the long leg is positioned under the top wall of the cassette cover. See also Assignee's U.S. Pat. No. 4,533,093 for a description of a facilitated method for loading this type of dust door spring on the polar member.

On the other hand, a dust door latch usually includes a substantially flat, rectangular body, pivotally supported by lateral pivot pins which rest in the cassette base. The latch body is urged outwardly by another spring attached to the latch body and abutting a wall of the cassette. First and second projections on the outward side surface of the latch body extend through corresponding openings formed in the side wall of the cassette base. The first projection engages a recess in the side of the dust door when the door is in a closed position, thereby latching the door. The second projection is exposed on the outside of the tape cassette, adjacent the dust door, to allow access by a movable pin on the tape player/recorder when the tape cassette is inserted into the tape player/recorder. The second projection is automatically depressed by the pin, the latch pivots against the force of the spring, releasing the first projection from engagement with the dust door, thereby unlatching the dust door, and the dust door is opened to expose the tape to the tape player/recorder.

One type of spring conventionally used to bias the latch is a separate, coil spring connected to a boss formed to extend from the latch body, as described in Assignee's U.S. Pat. No. 4,475,700. Torsion and leaf springs have also been used. Such a two piece latch has a cost disadvantage because of purchasing and assembling the second component, the spring.

Alternatively, one piece dust door latches are known, as described in U.S. Pat. No. 4,466,583, wherein the spring is integrally molded of the latch. This one piece latch has at least an environmental disadvantage—temperature has a great effect on plastic spring performance.

The drawbacks associated with a structure using separate springs for actuating the dust door and dust door latch are the costs associated with manufacturing and assembling multiple parts and the difficulty of handling, attaching and pre-loading two springs. As with any mass-produced, consumer item such as video cassettes, there is always a desire to eliminate parts and assembly steps to decrease overall cost.

In summary of the above, the prior art has widely adopted a dust door biased by a first spring and a dust door latch biased by a second, separate spring. The prior art still does not teach a biased door latch capable of the most cost efficient production nor the most time efficient automated assembly.

SUMMARY OF THE INVENTION

Accordingly, it is a purpose of the present invention to provide a tape cassette which can be made for less cost than conventional tape cassettes.

It is another purpose of the present invention to provide a biased dust door and a biased dust door latch for a video cassette which are capable of more cost-effective production than the prior art.

It is another purpose of the present invention to combine the functions of two separate molded components, a dust door and dust door latch positioned adjacent to each other in a cassette, so that they share a common spring.

To achieve the foregoing and other purposes of the invention, and in accordance with the purposes of the invention, there is provided a dust door and a dust door latch, both sharing a common spring. In one embodiment, the common spring is a separate torsion spring including a coil and a short leg and a long leg having an offset, said legs extending from the coil. The short leg fits into a polar member on the dust door, the coil surrounds the polar member and the long leg extends therefrom, terminating in a free end. The offset abuts the cover and the top of the free end abuts a projection formed on top of the dust door latch. Normally, the short leg, coil and offset bias the dust door into the closed position. The free end of the long leg normally biases the dust door latch into the latched position. In another embodiment, a leaf spring, molded integrally of the dust door latch abuts a cam lobe formed on the dust door polar member. The dust door latch can include a conventional separate spring or include an integral flexing member in the body thereof.

In these embodiments, when the dust door latch is actuated by the pin of the tape player/recorder, the latch pivots inwardly against the force of the common torsion spring or the separate spring of the latch, respectively, thereby unlatching the dust door, and allowing the dust door to be opened against the biasing force of the spring formed to extend between the polar member and the latch. When the pressure of the pin is removed, the dust door latch pivots back to its original latched position, and the dust door returns to its closed position.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE PREFERRED EMBODIMENTS

Figure 1:
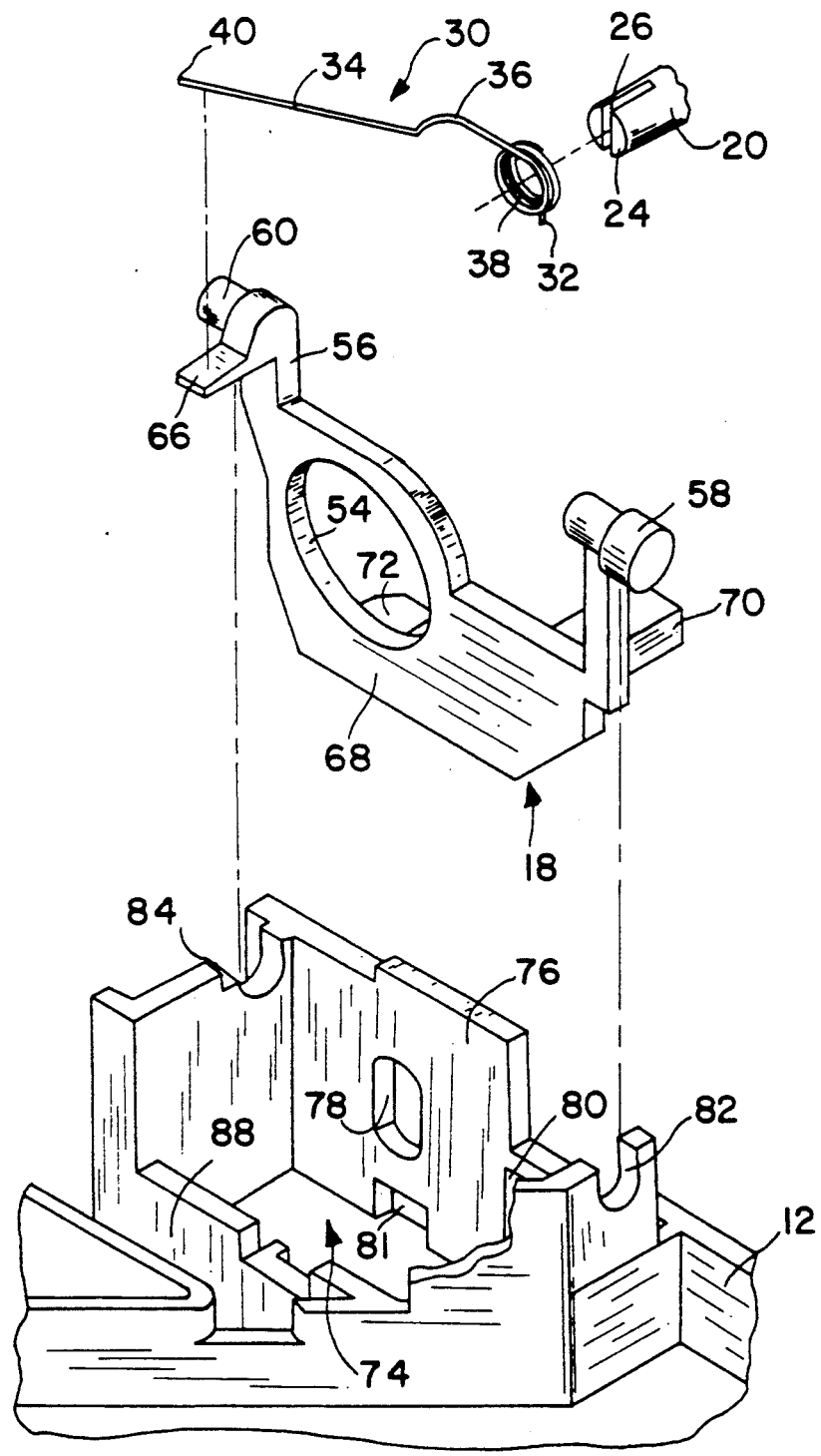
FIG. 1 is an exploded perspective view of the dust door latch being inserted into the cassette base, with the torsion spring being assembled on the dust door, according to the first embodiment of the present invention.
Figure 2:
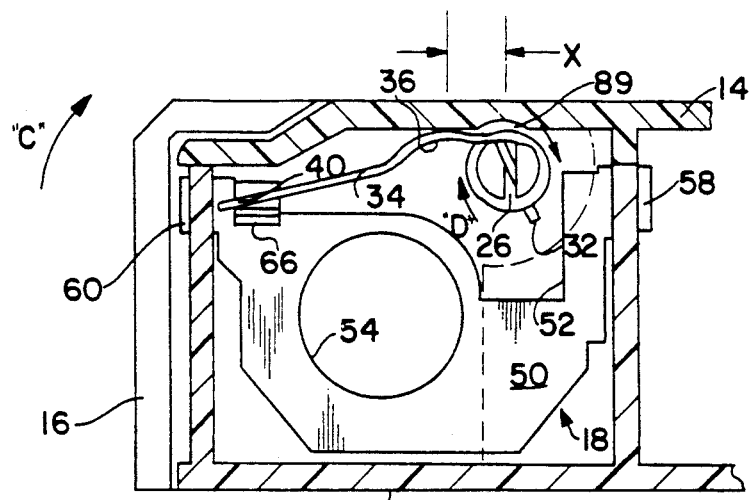
FIG. 2 is a side, cross sectional view of the dust door, dust door latch and common torsion spring according to the first embodiment.
Figure 3:
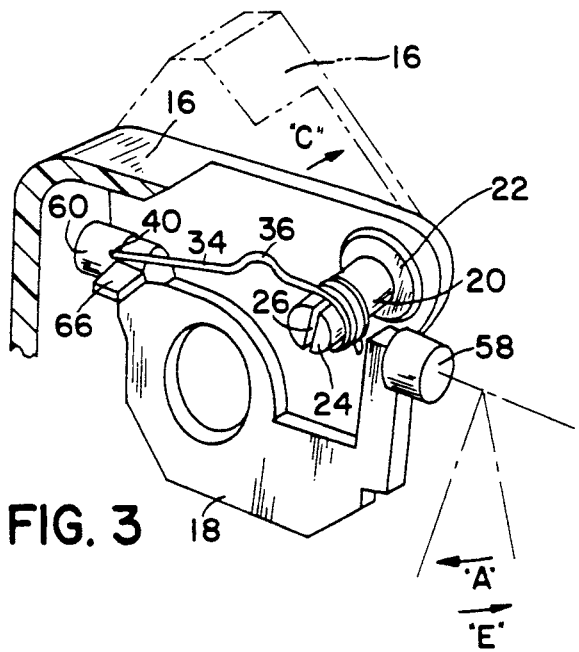
FIG. 3 is a perspective, cross sectional view of the common torsion spring of the first embodiment extending between a polar member on the dust door and a projection on the dust door latch.
Figure 4:
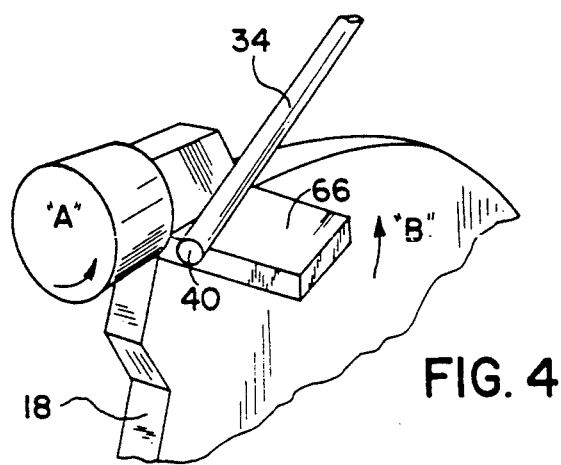
FIG. 4 is an exploded view of a free end of a long leg of the spring of the first embodiment abutting the projection formed on the dust door latch.

As shown in FIGS. 1-5, the tape cassette 10 of the first embodiment of the present invention generally includes a cassette base 12, a cassette cover 14, a dust door 16 pivotally connected at the sides of the cassette 10 and a dust door latch 18, also pivotally connected to the cassette 10.

Located on the dust door 16 is a polar member 20 having a fixed end 22 and a free end 24. A slit 26 is formed in the free end 24. This polar member 22 functions as one of the pivots for the dust door 16.

A torsion spring 30 having a short leg 32, a long leg 34 with an offset or bump 36 and a coil portion 38 therebetween, is loaded between the polar member 20, the cassette cover 14 and the dust door latch 18 in order to effect torsion of the spring 30 and accordingly bias the dust door 16 and dust door latch 18 normally in the closed and latched positions, respectively, as discussed more fully below.

In order to load the spring 30, the short leg 32 of the spring 30 is inserted into the slit 26 as the coil portion 38 is fit around the polar member 20. Then, the offset 36, which is formed between the coil portion 38 and the free end 40 of the long leg 34, is positioned against the cassette cover 14 in order to create the torsion in the spring 30 necessary to normally urge the dust door 16 into the closed position.

As can be seen, this spring 30 fits a conventional polar member. As such, the polar member 20 does not have to be modified to receive the short leg 32 and coil 38.

The latch 18 includes a planar body 50 having a recess 52 for clearance of the pivot pin 20 of the dust door 16, and a conventional circular light hole 54. A first, upper portion 56 includes two lateral supports or pivot pins 58, 60. The body 50 also includes a tang or projection 66 in the form of a relatively thin member formed adjacent the pivot pin 60 and perpendicular to the plane of the body 50.

A second lower portion 68 of the latch 18 includes two projections 70, 72 which enter corresponding openings discussed below, one 70 exposed and the other 72 further locking the dust door 16 via a receptacle (not shown) formed in the dust door 16, as known in the art.

An area 74 of the base 12 receives the latch 18 for pivotal movement, and includes a side wall 76 having an opening 78 which allows light to pass through the tape cassette 10 during use, as is well known in the art. The side wall 76 also includes openings 80 and 81 for receiving the projections 70 and 72, respectively. Receptacles 82, 84 are also formed in the base 12 to receive the pivot pins 58, 60, respectively.

Figure 5:
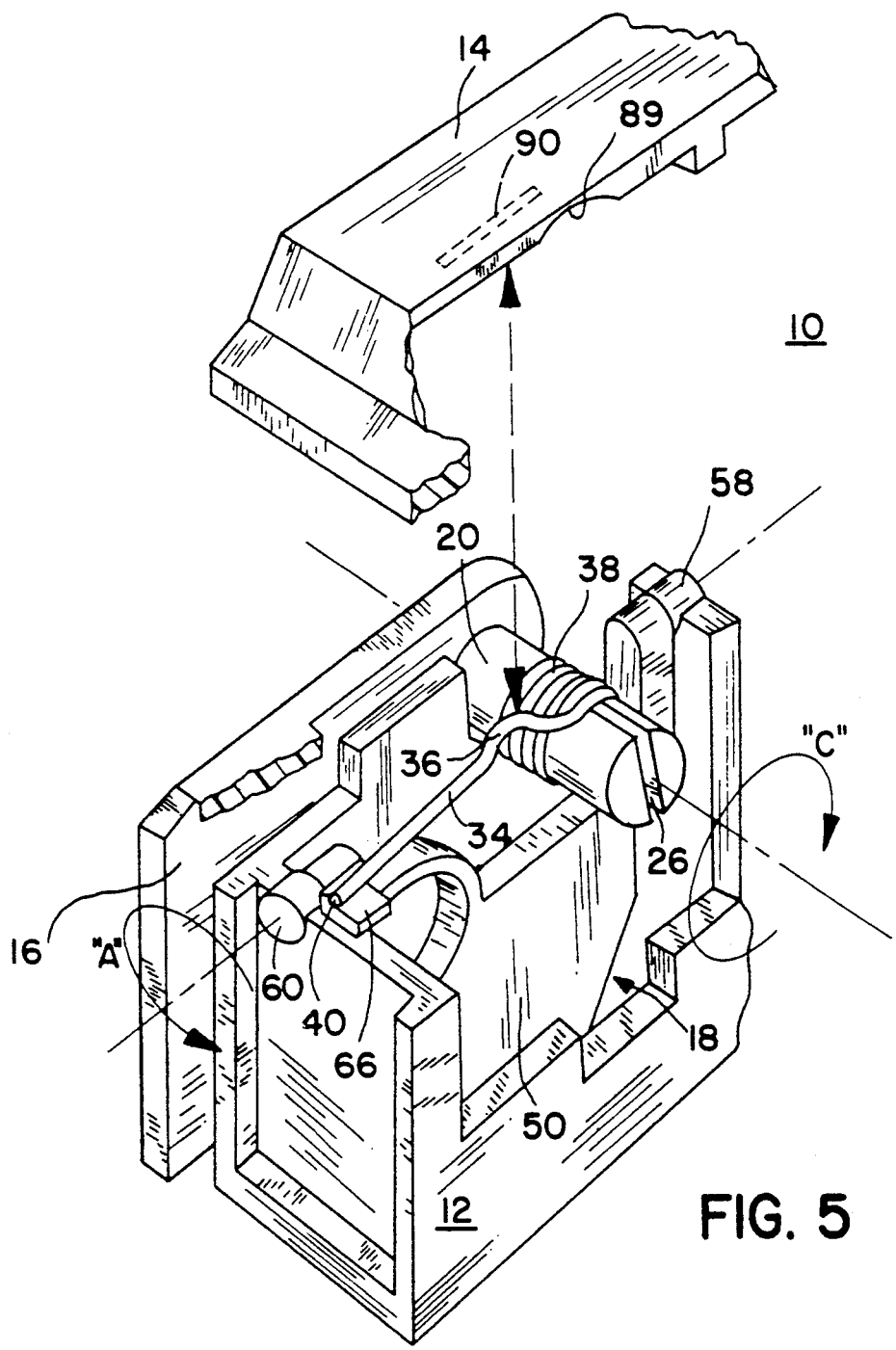
FIG. 5 is a perspective view of the cassette cover being loaded onto the cassette base after the first embodiment has been installed in the base.
Figure 6:
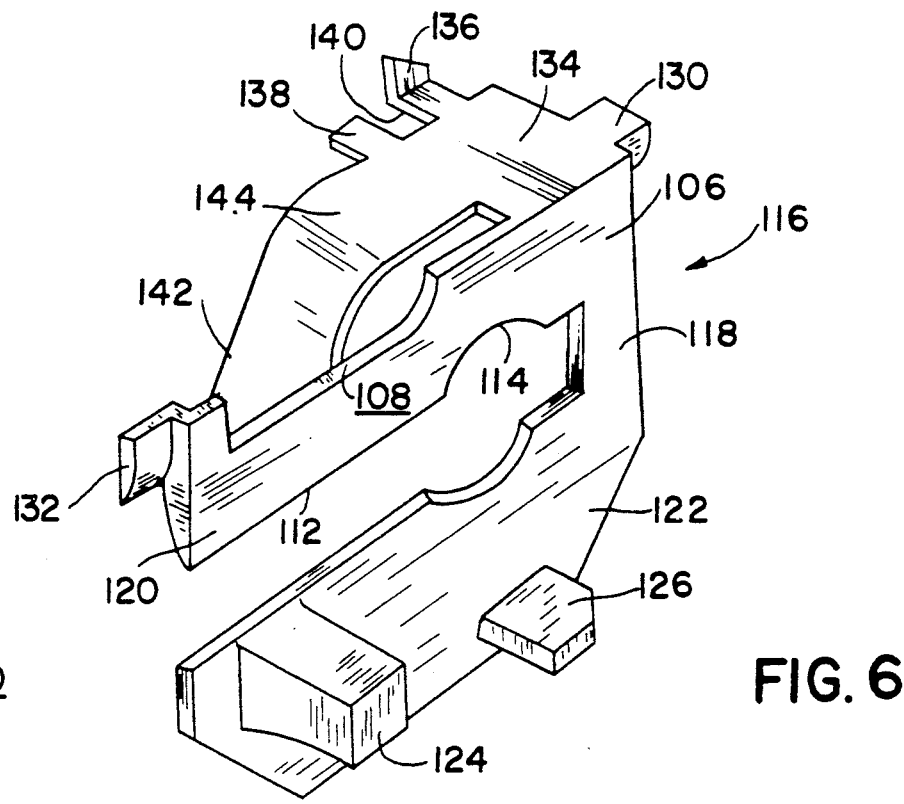
FIG. 6 is a front and left-side perspective view of the dust door latch and spring according to a second embodiment of the present invention.
Figure 7:
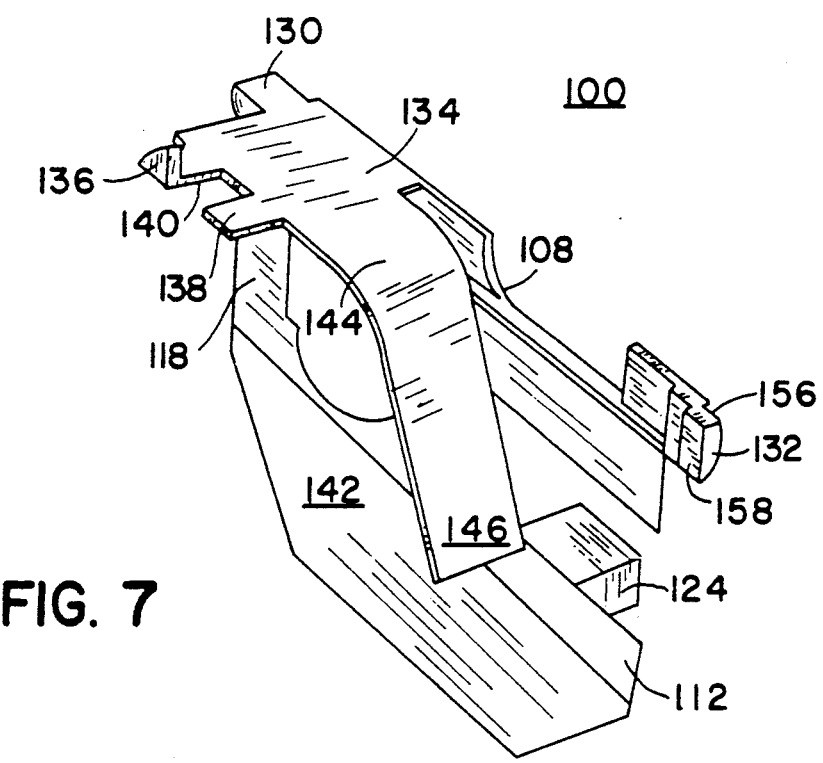
FIG. 7 is a rear and left-side view of the latch and spring shown in FIG. 6.

Referring particularly to FIG. 5, the cover 14 includes a recess 89 which provides clearance for the coil 38, and a groove 90 which receives the offset 36 of the spring 30. The groove 90 prevents lateral movement of the offset 36 during movement of the dust door 16.

When the door latch 18 is actuated by a pin of the tape player/recorder known in the art, the latch rotates in the direction of arrow "A" (FIGS. 3-5) and integral projection 66 rotates and applies an upward force "B" (FIG. 4) against the free end 40 of the long leg 34. Simultaneous to this door latch 18 movement, the dust door 16 is opened by rotating along arrow "C" (FIGS. 2-3 and 5), forcing a rotational motion "D" (FIG. 2) on the coil 38. This rotational motion builds kinetic energy or torsion in the spring 30, which wants to be released, i.e., wants to bias the dust door 16 closed. It is important to note that offset 36 is always tangent.

In comparison to the prior art spring, the spring 30 of the present invention performs the same function within dimension X (FIG. 2) as the prior art spring did along the entire length of the long leg of the conventional spring. The spring 30 of the present invention uses the same amount of material as the conventional dust door spring only. Thus, without using more material than the conventional dust door spring, the free end 40 of the leg 34 of the spring 30 can still perform a second function, which is to contact the projection 66 on the latch 18.

More particularly, the short leg 32, coil 38 and offset 36 serve the same purpose as the dust door spring of the prior art, i.e. a torsion spring. However, the free end of the long leg 34, i.e. the part of the spring 30 extending from the offset 36 to the end of the long leg 34 that abuts the projection 66, acts as a leaf spring. Never before has it been suggested to combine the functions of the dust door and the dust door latch by using a common biasing member.

When operation of the tape ends, the pin releases pressure on the projection 70 and the latch 18 moves back to its original position along arrow "E" under the biasing influence of the free end 40 of the spring 30. Simultaneously, the dust door 16 is returned to its original closed position by the spring 30.

In the embodiment described above, a common spring is shared for activating both the dust door and dust door latch. However, in the embodiment described below, the dust door and dust door latch can cooperate in using a single spring to bias the dust door, but the dust door latch can include its own spring, preferably integral, for biasing.

More particularly, the second embodiment of the device of the present invention, shown in FIGS. 6-10, basically includes a dust door latch designated generally by reference number 100, which is received between a cassette cover 102 and cassette base 104. The latch 100 is a one piece, preferably injection molded part, shot in a resilient material such as nylon or acetal.

The latch 100 includes a planar body 106 having a substantially rectangular upper recess 108, for allowing access to a pivot pin of a dust door 110 described below and a rectangular centrally longitudinal opening 112 including a conventional circular light hole 114. The body 106 also includes a flexing means 116 in the form of a relatively thin flexible connector 118 formed between a first, upper portion 120 and a second, lower portion 122 of the latch body 106.

The first upper portion 120 includes two lateral supports 130, 132 and a projecting substantially planar, perpendicular member 134. A generally triangular shaped protuberance 136 projects from a free end 138 of the perpendicular member 134 in a direction away from the second end 122 of the body 106 and parallel to the body 106. Finally, a square shaped recess 140 is formed adjacent the triangular protuberance 136.

Also formed to extend from the perpendicular member 134 is a leaf spring 142. The leaf spring 142 is integrally molded to include a first portion 144 extending co-planar with the perpendicular member 134 and then downwardly at about a 45 degree angle to form a second, free portion 146.

The second lower portion 122 includes two projections 124, 126 which enter conventional corresponding openings, one 128 of which is shown, in the base 104 and dust door 110.

Figure 8:
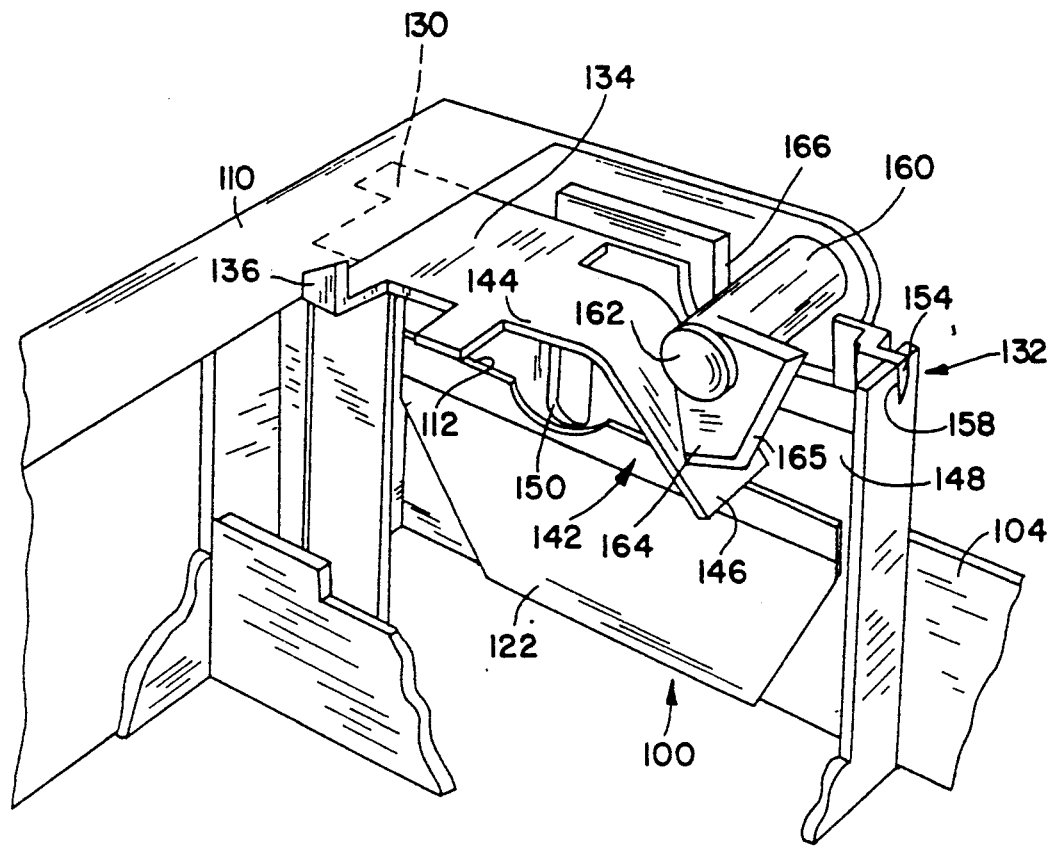
FIG. 8 is a perspective view of the dust door latch and common spring assembled in the cassette base, wherein the spring is abutted by a cam lobe formed on the polar member of the dust door (shown in the closed position), according to the second embodiment of the present invention.

FIG. 8 is a perspective view of the base 104 receiving the latch 100 and dust door 110. The base 104 includes a side wall 148 having an opening 150 which allows light to pass through the tape cassette during use, as is well known in the art. The side wall 148 also includes the openings for receiving the projections 124, 126. Receptacles 152, 154 are also formed in the base 104 to receive the supports 130, 132.

As can be seen, the pair of round pivot pins 58, 60 of the first embodiment are not used. Instead, the lateral support 132 includes flat sides 156, 158. The receptacle 154 includes corresponding flat sides. The abutting relationship of the flat sides of the support 132 and the flat sides of the receptacle 154 assist in preventing the first upper portion 120 of the latch 100 from pivoting relative to the cassette base 104, thereby allowing the second lower portion to flex relative thereto via the flexing means 116.

The cover 102 includes corresponding structure for receiving the non-movable perpendicular member 134, as described in Assignee's U.S. Pat. No. 5,026,000 the disclosure of which is incorporated by reference.

Figure 9:
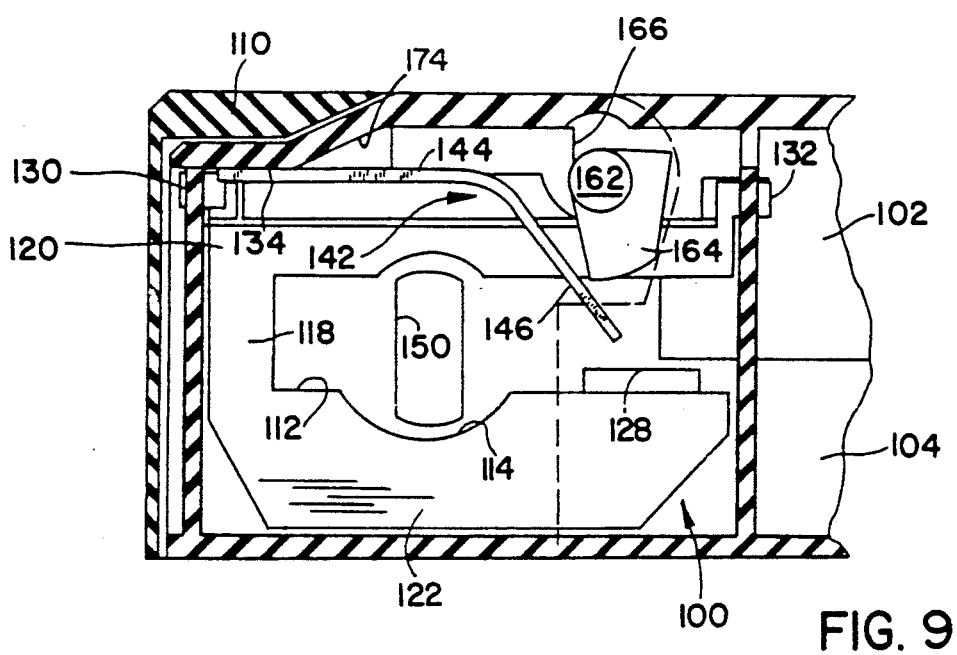
FIG. 9 is a side, cross-sectional view of the second embodiment when the dust door is closed.
Figure 11:
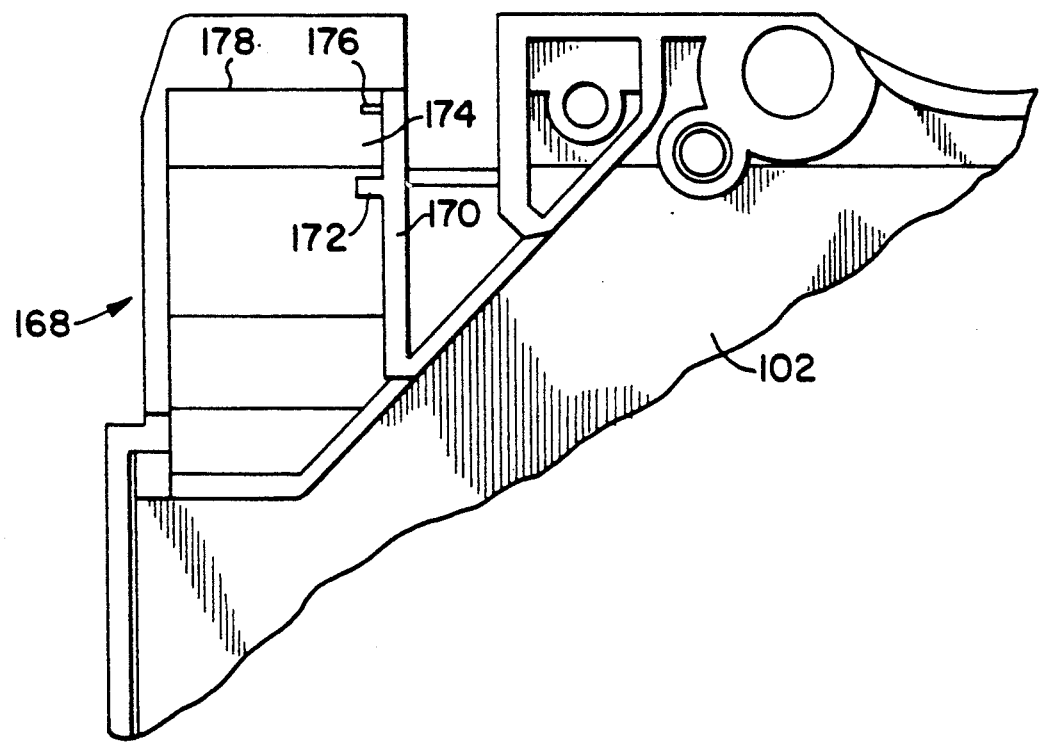
FIG. 11 is a plan view illustrating an area of the tape cassette cover which receives the latch according to the present invention.

More particularly, referring to FIG. 11, an area 168 includes a first wall 170 a vertical linear projection 172 and a recess 174 formed between the projection 172 and a small projecting member 176. The recess 174 is inclined as can be seen in FIG. 9. The area 168 also includes an abutting portion 178.

The cassette cover 102 is located on the base 104 so that: the linear, vertical projection 172 formed on the cover 102 enters the square shaped recess 140 of the body 106; the adjacent triangular shaped protuberance 136 of the latch/spring 100 mates with the corresponding recess 174 on the cover 102; and the planar perpendicular member 134 of the latch/spring 100 abuts the abutting portion 178 of the cover 102.

Figure 10:
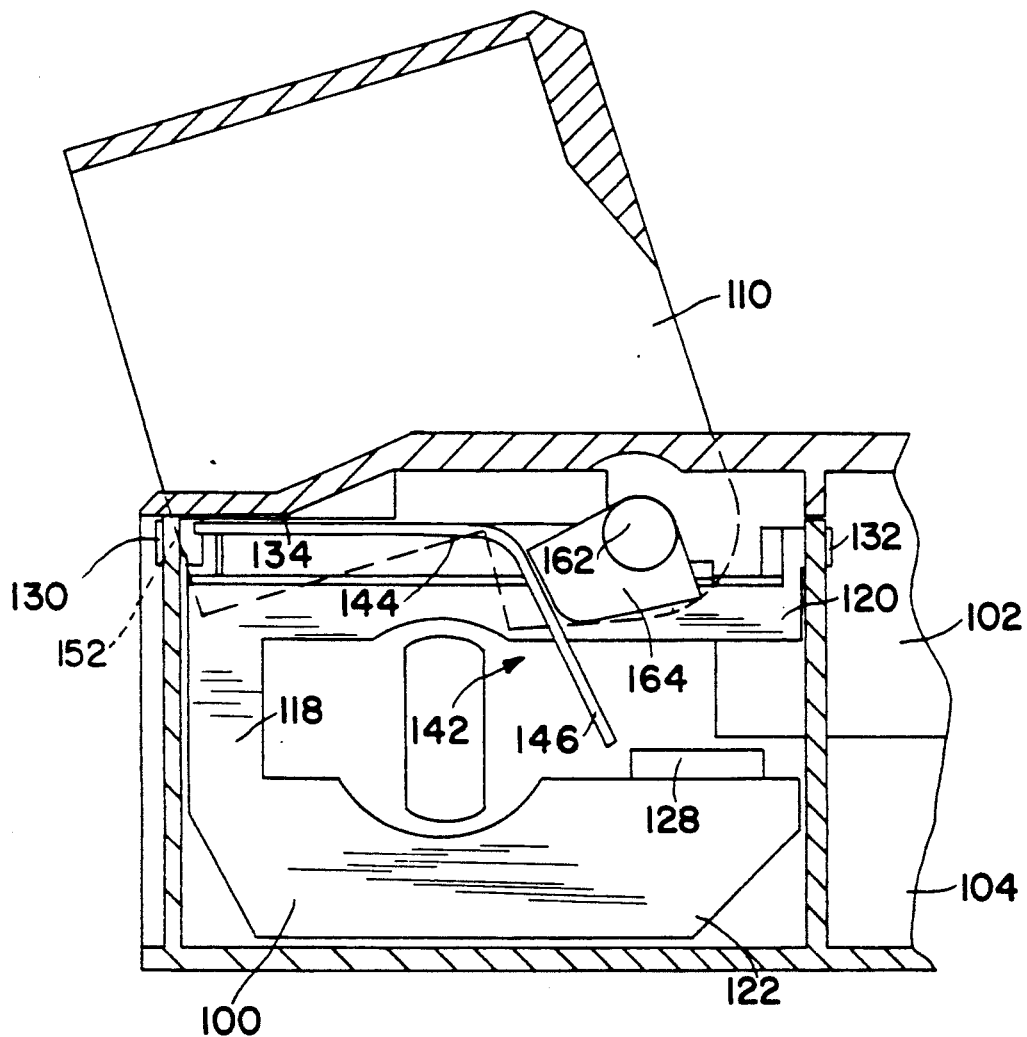
FIG. 10 is a side, cross-sectional view of the second embodiment when the dust door is open.

These combinations, as well as the receipt of the lateral supports 130,

As shown in FIGS. 8-10, the dust door 110 includes a cylindrical projection or a polar member 160. At a free end 162 of the polar member 160, there is formed a cam lobe 164. The cam lobe 164 includes a bevelled and angled surface 165.

The dust door latch 100 described above is first installed in the cassette base 104. Then, the dust door 110 is positioned in the base 104 with the polar member 160 being received through an opening 166 formed in the base 104 and extending through the opening 108 formed in the dust door latch 100. The cam lobe 164 is positioned adjacent the second portion 146 of the leaf spring 142, thereby creating kinetic energy at a flexible area merging the first portion 144 and the second portion 146 of the leaf spring 142.

During operation, a pin (not shown) of the tape player/recorder presses inward against the exposed projection 124, as known in the art. Since the first upper portion 120 and second lower portion 122 of the latch 100 are separated by the flexing means 116, and since the first upper portion 120 is effectively fixed between the base 104 and cover 102, the second lower portion 122 flexes or deflects inwardly relative to the first upper portion 120 under pressure. It is only at this time that any spring loading of the latch 100 occurs. As a result, the second projection 126 leaves engagement with the corresponding receptacle on the dust door 110, allowing the dust door 110 to be opened by the tape player/recorder. As the dust door 110 opens, the cam lobe 164 rotates against the second portion 146 of the leaf spring 142, thereby causing the spring 142 to move to the left in FIG. 8 and causing the spring 142 to be loaded.

When operation of the tape ends, the tape player/recorder pin releases pressure on the projection 124 and the second lower portion 122 flexes back to its original position co-planar with the first upper portion 120 under the biasing influence of the flexing means 116. Also, the dust door 110 returns to its original closed position as the cam lobe 164 rotates back under the biasing force of the leaf spring 142.

A benefit of the present invention is that the conventional cassette base does not have to be modified to receive the latches of the invention, except for modifying the receptacle 154 for the second embodiment. However, if desired, the conventional interior wall 88

(FIG. can be eliminated, since there is no separate spring arm which must be pre-loaded against the wall 88 in order to operate. Of course, eliminating wall 88 would simplify the cassette base 12 mold and would result in a savings of raw materials.

As can be seen, the present invention can eliminate the need for a separate projecting spring for the prior art dust door latch. This is a major cost advantage. Further, less assembly time is required over that of the prior art since the latch of the present invention is more easily installed in the cassette base. More particularly, no separate projecting spring arm must be attached or accurately biased against a cassette base wall in order to have the latch operate. Further, the latch is not sensitive to precise location relative to the wall 88.

The present invention is also more compact and therefore requires less space than the prior art structure. Also, production costs are reduced since the molds can be simpler and less materials are used, the separate, projecting, spring arm is eliminated, and the cassette base interior wall can be eliminated, if desired.

It can be seen from the above description that the present invention provides an improved dust door and dust door latch combination for a video cassette using fewer parts, allowing an easier automatic assembly method, and using an assembly method with fewer steps than known in the prior art, thus effecting more time and cost-efficient manufacture and production.

The above-described invention has been shown to be of the type intended for use in cassettes for video tape players/recorders. However, the invention can be similarly applied to tape cassettes for use in audio or other recording and/or reproducing apparatus.

The foregoing is considered illustrative only of the principles of the invention. Further, since numerous modifications and changes will readily occur to those skilled in the art, it is not desired to limit the invention to the exact construction and operation shown and described. Accordingly, all suitable modifications and equivalents may be resorted to that fall within the scope of the invention and the appended claims.

We claim:

1. A tape cassette, comprising:
   (a) a cassette base;
   (b) a cassette cover;
   (c) a dust door pivotally mounted between the base and cover;
   (d) a dust door latch pivotally mounted to the base; and
   (e) a single spring means extending between the dust door and the latch for normally biasing the dust door against the cassette and for biasing the dust door latch against an outer wall of the cassette,
   wherein the spring means has a coil, a first leg and a second leg including an offset,
   wherein the dust door includes a polar member having a slit, the cassette cover includes a groove and the dust door latch includes a projection, and
   wherein the coil surrounds the polar member, the first leg is received by the slit, the offset is tangentially received by the groove and the second leg abuts the projection.

2. The tape cassette as recited in claim 1, wherein the first leg is shorter than the second leg.

3. A tape cassette, comprising:
   (a) a cassette base having an external wall;
   (b) a cassette cover;
   (c) a dust door pivotally mounted between the base and cover;
   (d) a substantially planar dust door latch pivotably mounted to the base to move away from and toward the external wall of the base; and
   (e) spring means extending between the dust door and the latch for biasing the dust door against the cassette and for biasing the dust door latch against the external wall of the base,
   wherein the spring means includes a coil, a first leg, and a second leg having a first free end connected to the coil and a second end, and an offset between the first and second ends,
   wherein the dust door includes a polar member having a slit, the cassette cover includes a groove and the dust door latch includes a projection formed perpendicular to the planar latch,
   wherein the groove is formed in an area of the cover extending between the polar member and the projection, and
   wherein the coil surrounds the polar member, the first leg is received by the slit, the offset is received tangentially by the groove and the free end of the second leg abuts the projection.

4. The tape cassette as recited in claim 3, wherein the first leg is shorter than the second leg.

5. A tape cassette, including:
   (a) a cassette base;
   (b) a cassette cover including a groove;
   (c) a dust door pivotally mounted between the base and cover and including a slit;
   (d) a dust door latch pivotally mounted to the base and including a projection and a polar member; and
   (e) a single spring means extending between the dust door and the latch for biasing the dust door and dust door latch,
   wherein the spring means has a coil, a first leg and a second, relatively longer length including an offset,
   wherein the coil surrounds the polar member, the first leg is received by the slit, the offset is tangentially received by the groove and the second leg abuts the projection,
   wherein the first leg, coil and offset act as a torsion spring for normally urging the dust door into a closed position, and
   wherein the second leg acts as a leaf spring for normally urging the dust door latch into a latched portion with the dust door.

6. A tape cassette, comprising:
   (a) a cassette base;
   (b) a cassette cover;
   (c) a dust door pivotally mounted between the base and cover;
   (d) a dust door latch mounted to the base; and
   (e) spring means extending between the dust door and the latch for normally biasing at least the dust door against the cassette,
   wherein the dust door latch includes a first upper portion which is non-movably received by the cassette, a second lower portion and a flexing member formed therebetween which allows the second lower portion to flex relative to the first, upper portion, and
   wherein the spring means comprises a leaf spring integrally formed to extend from the upper portion of the latch.

7. The tape cassette as recited in claim 6, further comprising:

a polar member formed on the dust door and positioned adjacent the leaf spring, said polar member having a cam lobe, wherein when said dust door rotates from a closed position to an open position, said cam rotates against and loads the leaf spring.

8. The tape cassette as recited in claim 6 further comprising:
    (1) a planar latch body;
    (2) a pair of lateral supports, each extending from an upper portion of the planar latch body, at least one of the two lateral supports non-pivotally supporting the latch in the cassette base; and
    (3) a projecting, substantially planar, perpendicular member non-movably received by the cassette cover.

9. The tape cassette as recited in claim 6, wherein the latch further comprises:
    (a) a first projection to be abutted to flex the latch body; and
    (b) a second projection used to removably lock the dust door.

* * * * *

UNITED STATES PATENT AND TRADEMARK OFFICE
CERTIFICATE OF CORRECTION

PATENT NO. : 5,169,088
DATED : December 8, 1992
INVENTOR(S) : CRAIG LOVECKY et al.

It is certified that error appears in the above-identified patent and that said Letters Patent is hereby corrected as shown below:

Col. 6, line 23, after "130," insert --132 in the receptacles 152, 154 described above serve, in direct contrast to the conventional latch to fix substantially the first end 120 of the latch/spring 100 in the cassette tape.

As can be seen, no separate spring is biased against the cassette base 104 in the present invention. Instead, the flexing member 116 merely acts as the spring between the first, fixed end 120 and the second movable end 122.--.

Col. 7, line 1, "(FIG. can" should be --(FIG. 1) can--.

Signed and Sealed this

Twenty-first Day of December, 1993

*Attest:*

BRUCE LEHMAN

*Attesting Officer*     *Commissioner of Patents and Trademarks*

UNITED STATES PATENT AND TRADEMARK OFFICE
CERTIFICATE OF CORRECTION

PATENT NO. : 5,169,088

DATED : December 8, 1992

INVENTOR(S) : CRAIG LOVECKY et al.

It is certified that error appears in the above-indentified patent and that said Letters Patent is hereby corrected as shown below:

Column 8, line 38, "length" should be --leg--;

line 48, "portion" should be --position--.

Signed and Sealed this

Thirteenth Day of February, 1996

Attest:

BRUCE LEHMAN

Attesting Officer        Commissioner of Patents and Trademarks